United States Patent
Trocciola et al.

[11] 3,867,206
[45] Feb. 18, 1975

[54] WET SEAL FOR LIQUID ELECTROLYTE FUEL CELLS

[75] Inventors: John C. Trocciola, Glastonbury; Craig R. Schroll, West Hartford; Dan E. Elmore, South Windsor, all of Conn.

[73] Assignee: United Aircraft Corporation, East Hartford, Conn.

[22] Filed: Dec. 21, 1973

[21] Appl. No.: 427,210

[52] U.S. Cl............ 136/86 D, 136/120 FC, 136/153
[51] Int. Cl..................... H01m 27/04, H01m 27/02
[58] Field of Search................. 136/86, 153, 120 FC

[56] References Cited
UNITED STATES PATENTS

| | | | |
|---|---|---|---|
| 3,359,134 | 12/1967 | Salvadori et al. | 136/86 R |
| 3,364,071 | 1/1968 | Kordesch | 136/86 R |
| 3,365,334 | 1/1968 | Thellmann | 136/86 R |
| 3,442,712 | 5/1969 | Roberts, Jr. | 136/86 R |
| 3,531,329 | 9/1970 | Selwitz | 136/86 D |

FOREIGN PATENTS OR APPLICATIONS

| | | | |
|---|---|---|---|
| 1,174,765 | 12/1969 | Great Britain | 136/86 R |

Primary Examiner—Allen B. Curtis
Attorney, Agent, or Firm—Stephen E. Revis

[57] ABSTRACT

Escape of reactant gases from a fuel cell is prevented by sandwiching an electrolyte saturated porous electrode end and an electrolyte saturated matrix between surfaces which are thereby wet by the electrolyte, the electrolyte providing a wet capillary seal against the escape of gas.

3 Claims, 3 Drawing Figures

3,867,206

WET SEAL FOR LIQUID ELECTROLYTE FUEL CELLS

BACKGROUND OF THE INVENTION

The present invention relates in general to fuel cells and more particularly, to fuel cells utilizing gaseous reactants and a liquid electrolyte.

Fuel cells, of course, are well known devices for continuously generating electricity upon demand directly by the electrochemical reaction of a fuel and oxidant, normally supplied to the cell from external sources. The basic cell itself comprises two electrodes separated by an electrolyte. Fuel is oxidized at one electrode (anode) surrendering electrons and the oxidant is reduced at the other electrode (cathode) accepting electrons. External wiring provides for a flow of electrons through a load between the respective electrodes, the electrolyte forming an ionic path between the electrodes completing the circuit.

A great number of fuel cell variations are known, both in terms of cell design and structural configuration as well as in reactant, electrolyte and materials of construction. A common characteristic of all fuel cells, however, is the absolute necessity for preventing leakage and inadvertent mixing of the reactant gases both within and external to the cell. The results of such mixing can be catastrophic.

A prime consideration in fuel cells is, accordingly, the efficiency and reliability of the reactant gas sealing. Many diverse sealing schemes have been considered and utilized in the past, including the use of gaskets, O-rings and special cell frames, as well as techniques such as welding and brazing. Also included have been additional techniques such as those disclosed by Siebenberg et al. U.S. Pat. No. 3,481,737; Hodgdon, Jr. U.S. Pat. No. 3,484,293; and Tseung (British) Pat. No. 1,174,765.

In a case filed concurrently herewith entitled, Gas Seal for Liquid Electrolyte Fuel Cells, Fahle et al., the use of an electrolyte-saturated matrix to form a wet seal is described. A variation of the above case is disclosoed in another application entitled, Gas Seal for Liquid Electrolyte Fuel Cells, C. R. Schroll, Ser. No. 427,181 also filed concurrently herewith. The present invention is a variation of the inventions described in the above mentioned patent applications.

SUMMARY OF THE INVENTION

The present invention comprises a scheme for reactant gas sealing in fuel cells utilizing a liquid electrolyte; employing the wetting effect of the electrolyte itself to establish a wet seal. In this invention both an electrolyte-saturated matrix and an electrolyte saturated electrode end are utilized for the sealing function.

DESCRIPTION OF THE PREFERRED EMBODIMENTS

The particular invention involved here is adapted to use with a wide variety of fuel cell structures, materials and configurations. As such it is susceptible to wide usage and the materials employed in the cells in which it is utilized display no particular criticality in the context of the invention.

Figure 1:
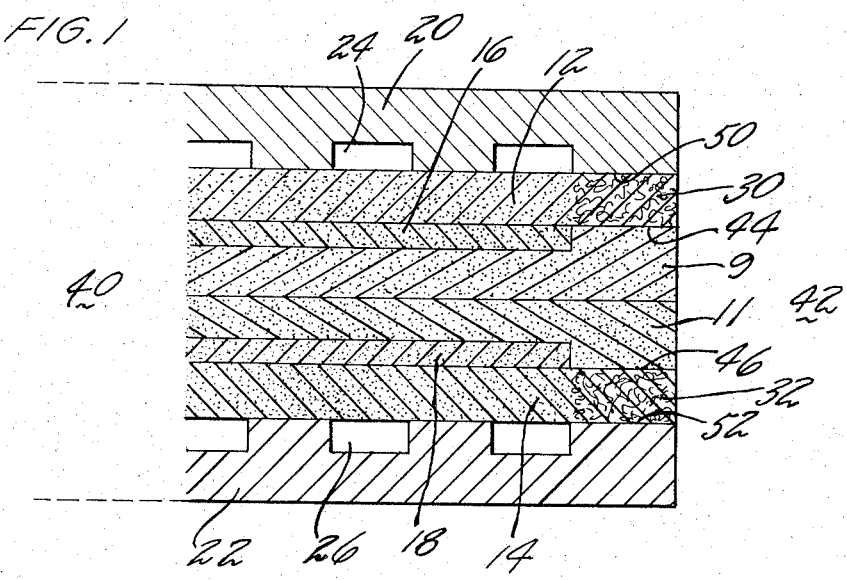
FIG. 1 is a partial cross-sectional view of a simple cell utilizing sealing according to one embodiment of the present invention.
Figure 3:
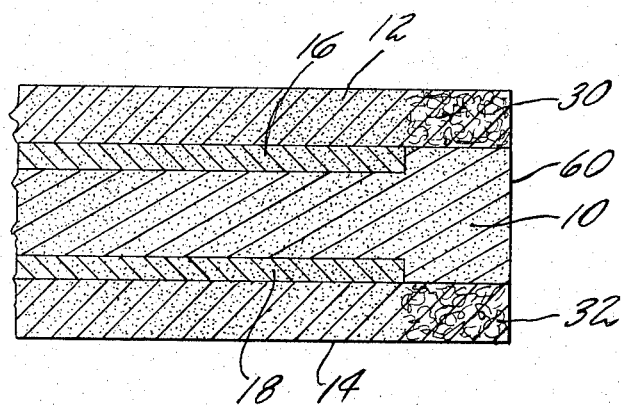
FIG. 3 is a cross-sectional view of a pair of electrodes/common matrix assembly.

One current fuel cell design is depicted in the drawing. In this type cell an electrolyte saturated matrix 10 as seen in FIG. 3 is sandwiched between and in contact with two electrodes 12 and 14, each having a catalytic coating thereon, 16 and 18, respectively. The matrix may be formed of two pieces 9 and 11 as shown in FIG. 1. In FIG. 1 the electrode/matrix assembly is shown in turn confined between a pair of gas separator plates 20 and 22, which define reactant gas spaces 24 and 26 respectively.

The electrodes may be any one of a number of types commonly utilized for electrode purposes in fuel cells. In a preferred construction for base cells, the electrode may be a gas porous nickel screen or sintered nickel powder sheet having a catalytic coating or layer thereon on the electrolyte side of the electrodes. In the case of an acid cell, the electrodes may be a gas porous carbon sheet carrying the catalytic layer.

The nature of the catalyst depends, of course, upon the particular fuel cell embodiments being utilized. The platinum group metals have found wide applicability as the catalytic agents in both acid and base cells. The gas separator plates as shown in FIG. 1, serve to provide electrical continuity between individual cells in a fuel cell stack in addition to their gas containment function. In base cells nickel separators have been used while carbon is present as the gas separator material in some acid cells.

The matrix material is necesarily hydrophilic since it carries and contains the electrolyte and is preferably of small pore size. Its essential characteristic is its ability to be impregnated with and to retain electrolyte by capillary action. Asbestos cloth or fiber mats have gained some acceptance as the matrix material in some base cells while the organic polymers have been employed with acid electrolytes.

The key element in the present invention comprises altering the characteristics of the ends or periphery of the electrodes 30 and 32 to provide an electrolyte-saturator capability therein. Normally, of course, the electrodes are gas porous and, to a substantial extent at least hydrophobic. In the present invention the ends of the electrodes are formed or otherwise processed to display a hydrophilic nature. This may be done by an impregnation technique utilizing materials such as tantala, graphite, polyarylsulfone, prefluorosulfonic acid, polyphenyl sulphide or the like, depending of course that the material selected is compatible with the electrolyte. Also, if there is any very hydrophobic polymer like polytetrafluoroethylene present in the electrode, this is preferably burned out or otherwise removed prior to impregnation with the hydrophilic material.

Thus, as shown in FIG. 1, the electrolyte-saturated matrix is caused to serve a number of functions. It is, of course, the electrolyte carrier in the cell. Additionally, it serves as the gas barrier between the fuel in the space 24 between the anode 12 and the separator 20, and the oxidant in the space 26 between the cathode 14 and the separator 22.

The gas leakage to be prevented in this embodiment is from the interior 40 to the exterior 42 of the cell. The electrolyte held by capillary action in the matrix prevents the passage of gas therethrough. The wetting action of the electrolyte also inhibits gas leakage past the surfaces 44 and 46.

The electrolyte impregnated ends 30 and 32 of the electrodes 12 and 14 respectively similarly prevents the escape of gas through the electrode while the wetting action of the electrolyte seals the surfaces 50 and 52 of the separators 20 and 22.

If the separators are not inherently wettable, the surfaces thereof may be simply coated or treated to provide such wettability.

Thus, it will be seen that the electrolyte itself is utilized to provide a wet seal bridging the entire space between the separators. The differential pressure capability of the sealing scheme is governed by capillary forces which in turn are a function of the particular materials involved and their pore size, the type and temperature of the electrolyte affecting its viscosity, and as appropriate the type and condition of the surface being sealed. Wet seals have been demonstrated to form effective barriers to the passage of low pressure reactant gases in many hours of cell operation.

Figure 2:
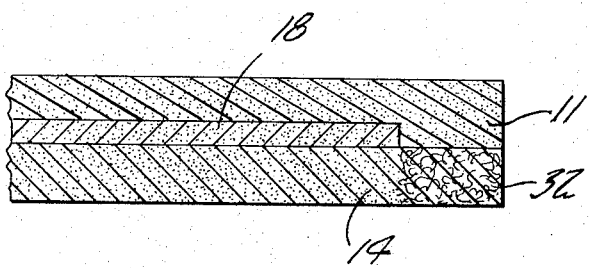
FIG. 2 is a cross-sectional view of a single electrode/matrix assembly.

FIG. 2 shows a simple electrode-matrix assembly from the assembly of FIG. 1.

In FIGS. 1 and 2 the matrix is shown as two pieces. In other words, a matrix 11 has been shown associated with electrode 14, while another matrix 9 is associated with electrode 12. Of course, the matrix materials per se would typically be identical and could comprise a sprayed on coating or could be separate elements.

FIG. 3 shows another embodiment. In this assembly a single matrix 10 is sandwiched between a pair of electrodes. Particularly with reference to the construction of FIG. 3, it will be noted the end or periphery of the matrix (in the claims referred to as the "peripheral sealing portion of the matrix") is sandwiched between the ends 30, 32 of the electrodes 12, 14 so that the entire end 60 of the assembly comprises a seal. A plurality of such assemblies stacked one atop the other would, of course, be sealed along that entire electrolyte-saturated end.

The real value of the invention resides in its inherent simplicity. No excessive expense is involved at assembly nor are special component manufacturing problems introduced. The individual electrode/matrix or electrode/matrix/electrode assemblies may all be identical. Furthermore, the seals are reliable.

Although the invention has been disclosed in connection with certain preferred embodiments, obvious alternatives and improvements will be evident to those skilled in the art within the truescope of the invention as set forth in the following claims.

What is claimed is:

1. A fuel cell electrode comprising an electrically-conductive material having a peripheral sealing portion and a central active portion, said active portion including a catalytic surface and being porous to the transmission of gas and substantially hydrophobic, said sealing portion being hydrophilic and having the capability of retaining electrolyte therein through its thickness by capillary action, thereby providing a wet seal capability in said sealing portion.

2. A fuel cell assembly for fuel cells utilizing gaseous reactants and a liquid electrolyte which comprises:
a pair of fuel cell electrodes each comprising an electrically conductive material and having a peripheral portion and a central active portion, said active portion being porous to the transmission of gas and substantially hydrophobic, said peripheral portion of one of said electrodes being hydrophilic, said electrodes each having an inner surface and an outer surface, said active portion of said inner surface including a catalyst;
a matrix sandwiched between said inner surfaces of said electrodes and including a peripheral sealing portion sandwiched between said peripheral portions of said electrodes and in contact therewith;
a pair of gas separators, one positioned outwardly of each of said electrodes defining a gas space between the respective separators and the active portions of said electrodes, each of said separators having a peripheral portion one of which includes a sealing surface wettable by said electrolyte, said peripheral portions of said electrodes being sandwiched between said peripheral portions of said separators, said wettable sealing surface of said separator being in contact with said outer surface of said hydrophilic peripheral portion of said electrode; and
a liquid electrolyte, said electrolyte saturating said matrix between said inner surfaces of said electrodes and saturating said hydrophilic peripheral portion of said electrode through to said wettable sealing surface of said separator, said electrolyte being retained within said matrix and within said hydrophilic peripheral portion of said electrode by capillary action, said electrolyte forming a wet seal within said hydrophilic peripheral portion of said electrode and within said peripheral sealing portion of said matrix and between said hydrophilic peripheral portion of said electrode and said wettable sealing surface of said separator preventing the escape of gas thereby.

3. The fuel cell assembly according to claim 2 wherein said peripheral portion of both of said electrodes is hydrophilic and said peripheral portion of each of said separator plates includes a sealing surface wettable by said electrolyte.

* * * * *